US008073978B2

(12) United States Patent
Sengupta et al.

(10) Patent No.: US 8,073,978 B2
(45) Date of Patent: Dec. 6, 2011

(54) PROXIMITY GUIDED DATA DISCOVERY

(75) Inventors: Sudipta Sengupta, Redmond, WA (US); Jin Li, Sammamish, WA (US); Vijay Vasudevan, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 237 days.

(21) Appl. No.: 12/490,811

(22) Filed: Jun. 24, 2009

(65) Prior Publication Data

US 2010/0332579 A1 Dec. 30, 2010

(51) Int. Cl.
*G06F 15/16* (2006.01)
*H04L 12/28* (2006.01)

(52) U.S. Cl. ........ 709/249; 370/401; 370/404; 370/408; 709/251

(58) Field of Classification Search .......... 709/201–203, 709/249, 251; 370/401, 404, 408
See application file for complete search history.

(56) References Cited

U.S. PATENT DOCUMENTS

| | | | |
|---|---|---|---|
| 6,415,323 B1 | 7/2002 | McCanne et al. | |
| 6,581,104 B1 | 6/2003 | Bereiter | |
| 6,832,253 B1 | 12/2004 | Auerbach | |
| 7,359,930 B2 | 4/2008 | Jackson et al. | |
| 2005/0005006 A1 | 1/2005 | Chauffour et al. | |
| 2008/0005071 A1 | 1/2008 | Flake et al. | |
| 2008/0276091 A1* | 11/2008 | Welin et al. | 713/170 |
| 2009/0119386 A1* | 5/2009 | Busser et al. | 709/218 |
| 2010/0061385 A1* | 3/2010 | Welin et al. | 370/401 |

OTHER PUBLICATIONS

Zhao, et al., Locality Aware Mechanisms for Large-Scale Networks, Retrieved at <<http://pompone.cs.ucsb.edu/~msa/reading/fudico-locality.pdf>>, In Proceedings of the FuDiCo May 2, 2002, pp. 4.
Cheng, et al., "Secure Bootstrapping of Distributed Hash Tables in Dynamic Wireless Networks", Retrieved at <<http://ieeexplore.ieee.org/stamp/stamp.jsp?arnumber=04288990>>, IEEE International Conference on Communications, Jun. 24-28, 2007, pp. 1917-1922.
Lagesse, et al., "UBCA: Utility-based Clustering Architecture for Peer-to-Peer Systems", Retrieved at <<http://ieeexplore.ieee.org/stamp/stamp.jsp?arnumber=04279002>>, 27th International Conference on Distributed Computing Systems Workshops, Jun. 22-29, 2007, pp. 7.
Sacha, et al., "A Gradient Topology for Master-Slave Replication in Peer-to-Peer Environments", Retrieved at <<http://www.cs.vu.nl/~jsacha/pub/dbisp2p05/>>, In Post-Proceedings of the 3rd International Workshop on Databases, Information Systems and Peer-to-Peer Computing, LNCS, 2005, pp. 1-12.
Freedman, et al., "Sloppy hashing and self-organizing clusters", Retrieved at <<http://www.coralcdn.org/docs/coral-iptps03.pdf>>, In The International workshop on Peer-To-Peer Systems, 2003, pp. 1-6.

* cited by examiner

*Primary Examiner* — Joseph Avellino
*Assistant Examiner* — Aftab Nasir Khan

(57) ABSTRACT

Techniques are described for sharing content among peers. Locality domains are treated as first order network units. Content is located at the level of a locality domain using a hierarchical DHT in which nodes correspond to locality domains. A peer searches for a given piece of content in a proximity guided manner and terminates at the earliest locality domain (in the hierarchy) which has the content. Locality domains are organized into hierarchical clusters based on their proximity.

19 Claims, 10 Drawing Sheets

PROXIMITY GUIDED DATA DISCOVERY

BACKGROUND

Computers often need to obtain, via a network, resources such as web pages, software packages, binary media, documents, etc. Client computers, for example, may obtain such resources directly from servers. In a complex network such as a global enterprise with disperse subnets or campuses communicating via relatively slow WAN links, transmitting resources from distant servers to clients separated by a WAN link can tax the bandwidth of a WAN link. Peer-to-peer resource sharing has been used to reduce inter-subnet traffic by allowing peers to exchange resources directly. In a peer-to-peer resource sharing network, peer computers that acquire a resource may share the resource with other peer computers; a computer needing a resource may determine that a copy of the resource is available at a computer (peer) other than the server where the resource is generally available. In such a case, the computer may obtain the resource from the peer computer.

While many peer-to-peer resource sharing schemes have been used, there is a need for a peer-to-peer resource sharing scheme that may be maintained with little overhead and may allow peers to search for resources first from nearby or proximate peers before searching more distant or less proximate peers. Techniques related to proximity-guided peer resource discovery are described below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described for sharing content among peers. Locality domains or subnets are treated as first order network units. Content is located at the level of a locality domain using a hierarchical distributed hash table (DHT) in which nodes correspond to locality domains. A peer searches for a given piece of content in a proximity guided manner and terminates at the earliest locality domain (in the hierarchy) which has the content. Locality domains are organized into hierarchical clusters based on their proximity.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to proximity guided resource discovery in which subnets of a network are represented as first-order entities having identifiers in a same identifier space as identifiers (keys) of resources and identifiers of peers that connect to the network via the subnets. A context for peer-to-peer resource discovery and acquisition will be described first. Hierarchies for guiding a peer's search for a resource will be described next, followed by explanation of components and processes of peers that may provide and search for resources in such hierarchies.

A Peer-To-Peer Resource Sharing Framework

Figure 1:
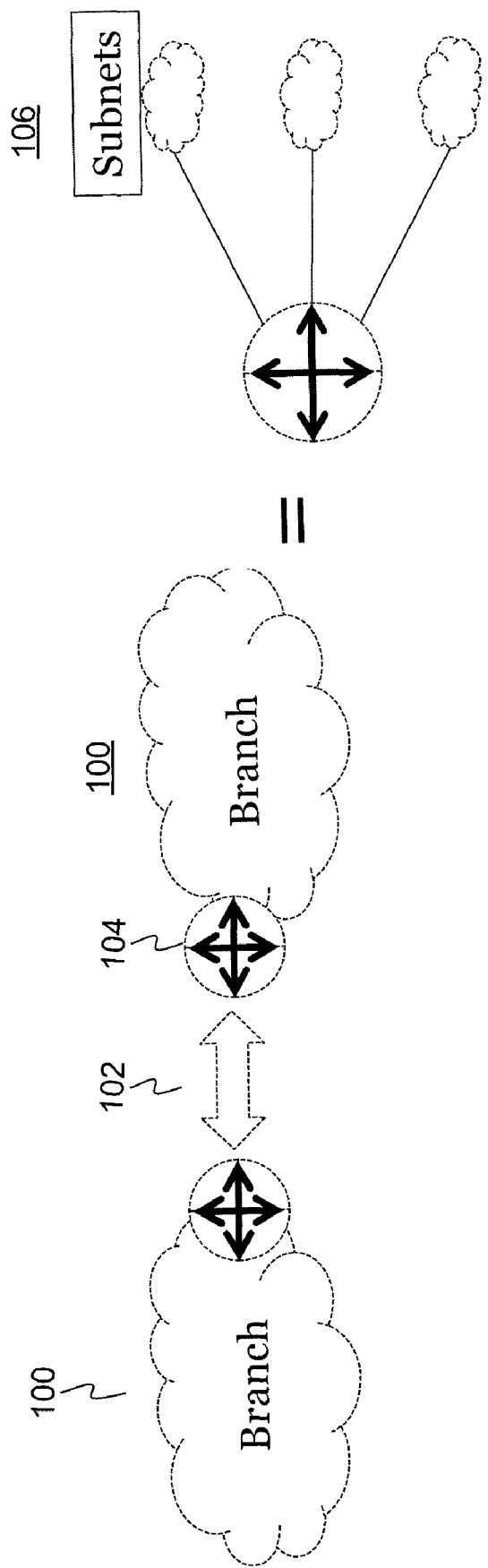
FIG. 1 shows a portion of a typical enterprise network.

FIG. 1 shows a portion of a typical enterprise network. Such a network may include a number of branch offices, or branches 100, which might correspond to a physical campus, building, logical divisions of the network, etc. Distant branches 100 may be connected with links 102, sometimes referred to as WAN links, which in some cases are lines or satellite channels leased from a telecommunication company. Such links 102 often carry network traffic using special point-to-point frame-relay protocols. A branch 100 (or high level subnet) may connect to a link 100 via router 104, which may also provide connections to a number of subnets 106 of the branch 100. Computing devices such as servers, clients, etc., may connect to the network via a subnet 106.

Generally, a computer on a network communicates with other computers on its own subnet at relatively high speeds and at relatively low cost. A computer communicates with computers on other subnets in its network branch (or higher level subnet, autonomous system, etc.) at a slower speed and at relatively high cost. A computer communicates with a computer of a remote branch via a link 100 relatively slowly; the link 100 having the effect of bottlenecking communications between opposing branches 100. Note that an enterprise-like network may have one or more gateways to external networks such as the Internet, which might be another bottleneck. As an example, intra-subnet communications might have latencies of a few milliseconds, inter-subnet communications (same branch office) might have latencies of 30 milliseconds, and inter-subnet communications (different branches via a link) might have latencies of 100 milliseconds. Moreover, there may be abundant bandwidth available in the intra-subnet and in the same branch office. However, the link across different branch offices may be leased, and may be more costly.

It should be understood that the network described above is a simple example. Although actual networks vary greatly in complexity and architecture, most have some form of logical and physical hierarchy and computers therein experience measurably increasing latency as their communications require increasing numbers of hops to reach remote endpoints, and typically there are jumps in latency at routers, WAN links, and other network boundaries or features.

As will be discussed in detail later, a computer can discern network topology by probing its network (e.g., using a route tracing utility) and analyzing latencies to identify structural boundaries and proximity of subnets in the network. For example, network structure may be identified by abrupt changes in latencies of respective routers providing a network path between two computers. A computer may also determine network structure by obtaining router update messages or other network configuration data, or simply by being provided with information directly describing the topology of its network.

Figure 2:
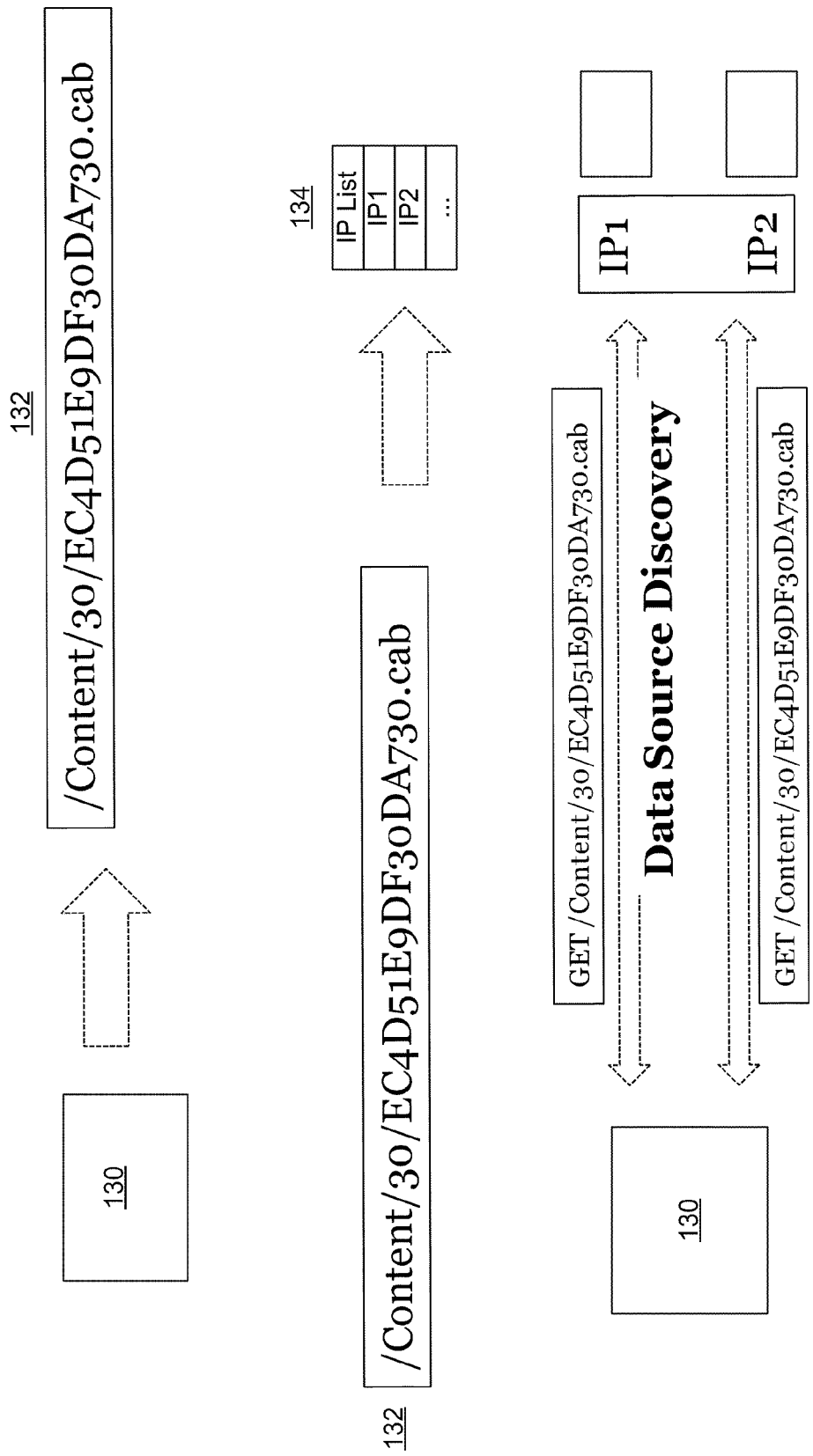
FIG. 2 shows an example of a peer-to-peer resource sharing framework.

FIG. 2 shows an example of a peer-to-peer resource sharing framework. The example of FIG. 2 illustrates generally how resources may be identified and found by a peer. In the example, a peer computing device 130 has an identifier 132 (e.g., URL, network address plus file path, etc.) of a binary archive resource that the peer 130 is seeking, perhaps as instructed by a user. The peer may transmit the resource identifier 132 to a server, for example a web server or file server (not shown). The web server may determine the scope that the resource may be shared with, and return a scoped resource ID that corresponds to the resource in the appropriate scope. The peer can then use the scoped resource ID to discover the resource in the hierarchy. The peer may consult a centralized server in the appropriate scope, which can consequently either return a list 134 of network or IP addresses 134 of peers where the resource is available. Alternatively, the peer 130 may consult a data source or resource discovery service from which the peer 134 obtains the list 134. The peer 130 then obtains the resource from the one or more addresses or peers identified in the list 134. As used herein, the term "resource" (or alternatively, "object") refers both to a complete unit of data such as a file, web page, or any discrete unit of data, as well as portions or pieces of same. In practice, there is little difference between a client obtaining a discrete resource and a client obtaining pieces of the resource; in both cases the processes of locating and copying a whole resource or its pieces are similar. Therefore, the term "resource" as used herein refers to discrete resources as well as pieces thereof.

Figure 3:
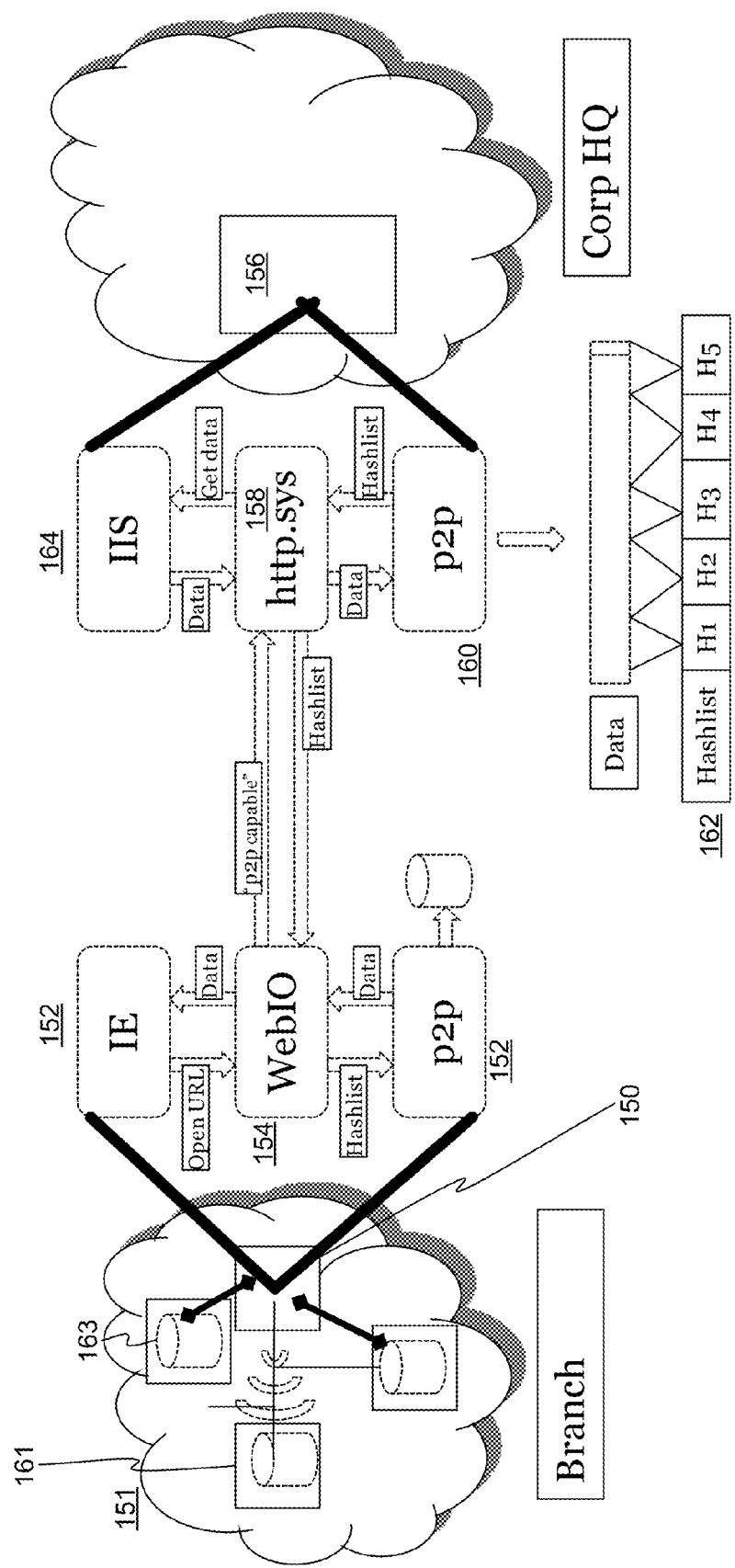
FIG. 3 shows an example of how a peer-to-peer resource sharing network may be integrated with higher-level applications.

FIG. 3 shows an example of how a peer-to-peer resource sharing network may be integrated with higher-level applications. A client 150 on a subnet 151 may have a web browser 152. When the browser 152 needs a URL, it sends an open-URL request to a web module 154 (e.g., an HTTP implementation). The web module 154 sends the URL to a server's 156 HTTP module 158, along with an indication that the client is capable of peer-to-peer resource sharing. The HTTP module 158 responds to the notice of peer-to-peer capability by attempting to find the resource on a peer-to-peer network. Accordingly, the HTTP module 158 notifies a peer-to-peer module 160 of the data or URL that is being sought. The peer-to-peer module 160, using any of a wide range of new or existing search techniques, queries a peer-to-peer network which the client 150 is participating in, including peers 161 storing resources 163. If a copy of the resource named by the URL is available on the peer-to-peer network then the peer-to-peer network sends to the peer-to-peer module 160 identifier(s) of the URL/resource. In the example of FIG. 3, the identifiers are in the form of a hashlist 162, which are hashes of one or more pieces of the URL/resource. If a copy of the URL/resource is not available from the peer-to-peer network, then the HTTP module 158, when so informed by the peer-to-peer module 160, transparently proceeds with normal resource acquisition via a web server 164 or the like.

In the scenario described above, a prior approach has been for the peer-to-peer module 160 to simply broadcast a request for the URL/resource to a local subnet (e.g., broadcast on subnet 151) and receive locations of the resource on such subnet. Another approach has been to use more sophisticated large-scale structured overlays such as distributed hash tables (DHTs) which may include peers beyond the local subnet. The first approach is limited in scope, and the second approach may be sensitive to churn (frequent additions or losses of peers) or may involve computational and bandwidth overhead to handle the complexities of maintaining a reliable DHT. The peer-to-peer resource sharing application discussed above is only an example. There are an unlimited number of applications that can use a peer-to-peer network. Embodiments of a peer-to-peer resource sharing scheme will be described next.

Peer-To-Peer Resource Discovery Schemes

Figure 4:
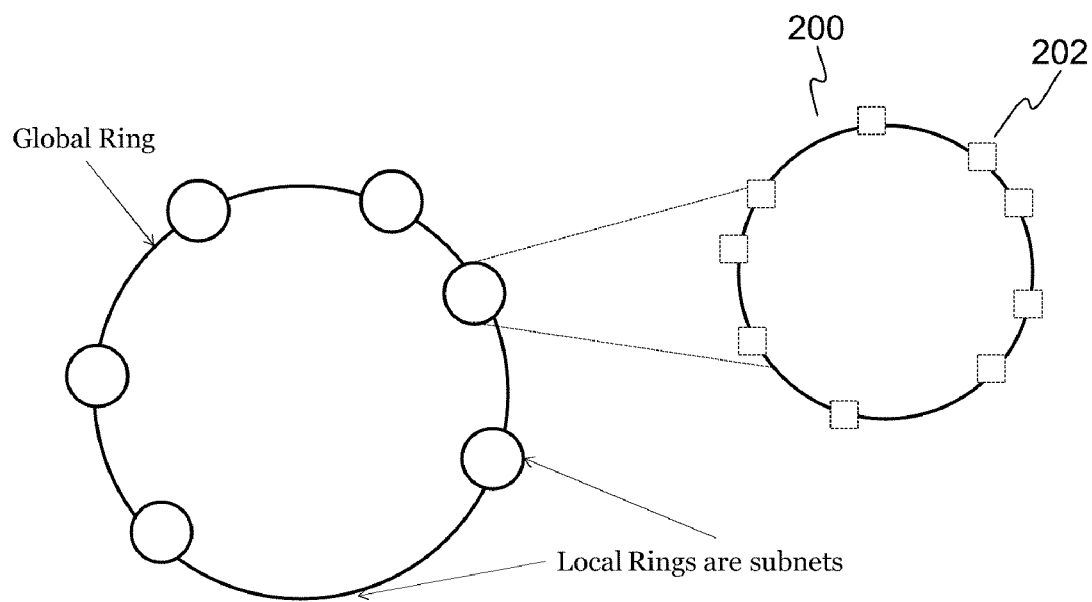
FIG. 4 shows a scheme for structuring a peer-to-peer network.

FIG. 4 shows a scheme for structuring a peer-to-peer network. In general, the scheme involves representing subnets of a network, such as subnet 200, as first-order entities in an overlay or peer-to-peer network. That is, subnets, peers 202, and objects (resources) are assigned identifiers in the same number space. For example, a same hash function may be used to obtain identifiers for the subnets, peers, and resources thereon. While in an ordinary peer-to-peer network peers maintain only mappings of object identifiers (object IDs) to peer addresses, in the present embodiment, globally, peers maintain mappings of subnet IDs to object IDs, and locally peers may maintain mappings of object IDs to local peers.

While embodiments described below are described with reference to "subnets", it should be understood that any organizational unit of peers may be used. As with other overlay type networks, the peer-to-peer schemes described herein are implemented above the network layer; at the application layer. While subnets are a convenient unit of organization, any arbitrary unit may be used. To reflect this, the term "locality domain" may be substituted wherever "subnet" is used herein. A locality domain is a unit of organization which may reflect some common locality but does not require it. Locality may refer to topological locality (low hop distances), latency, physical locality, and so forth. A locality domain may even be a random sample of peers. The point is that the embodiments described herein function with groupings of peers regardless of how the peers are grouped. A locality domain may be a unit of peers that mutually operate an autonomous peer-to-peer resource sharing mechanism such as a DHT overlay. In an embodiment operated on the global Internet, a locality domain might be, for example, peers in a given class C network, peers in a subnet of a class B network, peers in a plurality of networks/subnets of various classes, and so on.

As will be described below, the peers use their respective object ID mappings to search for requested objects and to inform other peers about the locations of objects. When a peer's mapping of subnet IDs is appropriately prioritized, for instance, by network proximity or least latency, a peer searching for a given object ID will search closest subnets first, and then slower or more distant subnets later. The mappings of the peers together implicitly form a hierarchical overlay structure of subnets and groupings of subnets, as explained next with reference to FIGS. 5 and 6.

Figure 5:
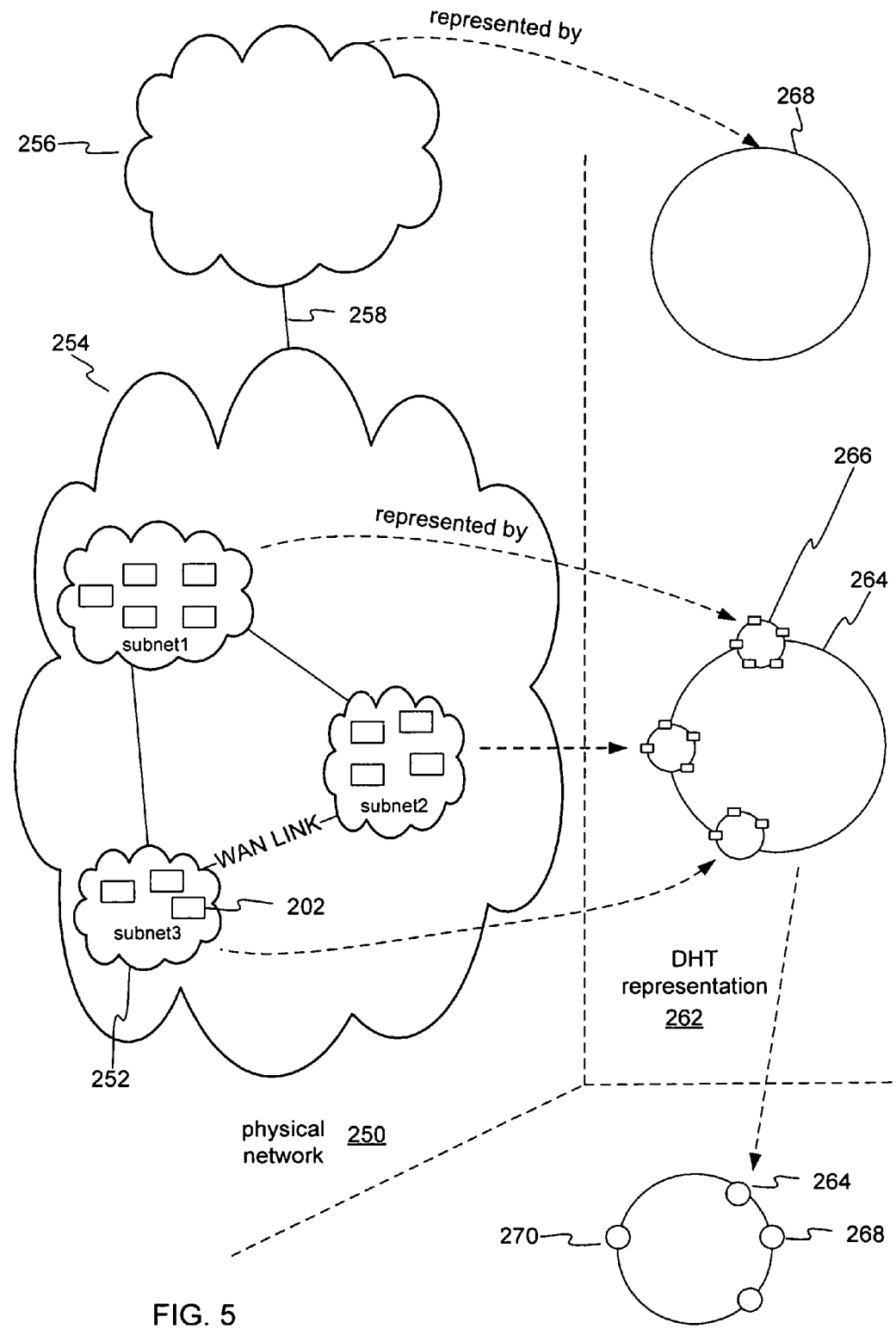
FIG. 5 shows how a physical network may be represented as a hierarchical data structure.

FIG. 5 shows how a physical network 250 may be represented as a hierarchical data structure. As explained above, the physical network 250 may be comprised of numerous subnets 252 to which peer devices 202 are connected. Subnets 252 may be part of an encompassing AS or subnet or branch 254, 256, which may be connected by one or more links 258. An inter-subnet hierarchy representation 262 represents the structure and relative latencies (or distances, or other network metrics) of the physical network 250. Each subnet 252, 254, 256 has a unique subnet ID. The various peers 202 among the subnets 252, 254, 256 store information including IDs of peers and IDs of subnets where such peers reside. In one embodiment, any given peer does not by itself maintain complete knowledge of the physical network 250. Rather different peers maintain different, perhaps overlapping, mappings between subnet IDs and object IDs. Collectively, the peers of a given subnet may know IDs of peers on sibling or parent subnets.

Referring again to FIG. 5, the inter-subnet hierarchy representation 262 is comprised of the subnet IDs of the subnets/branches of the physical network 250. For example, the subnet IDs of subnet1, subnet2, and subnet3 may be grouped to form a ring 264, where the nodes or members 266 of the ring 264 are the subnet identifiers of sibling subnets. Another ring 268 may correspond to subnet 256. The IDs of subnets 254 and 256 may belong to ring 268. It should be noted that in some embodiments the representation 262 is not a particular data structure residing on a single device but rather is the collection of subnet information stored on the various peers 202, as will be further explained with reference to FIGS. 7 and 8.

Figure 6:
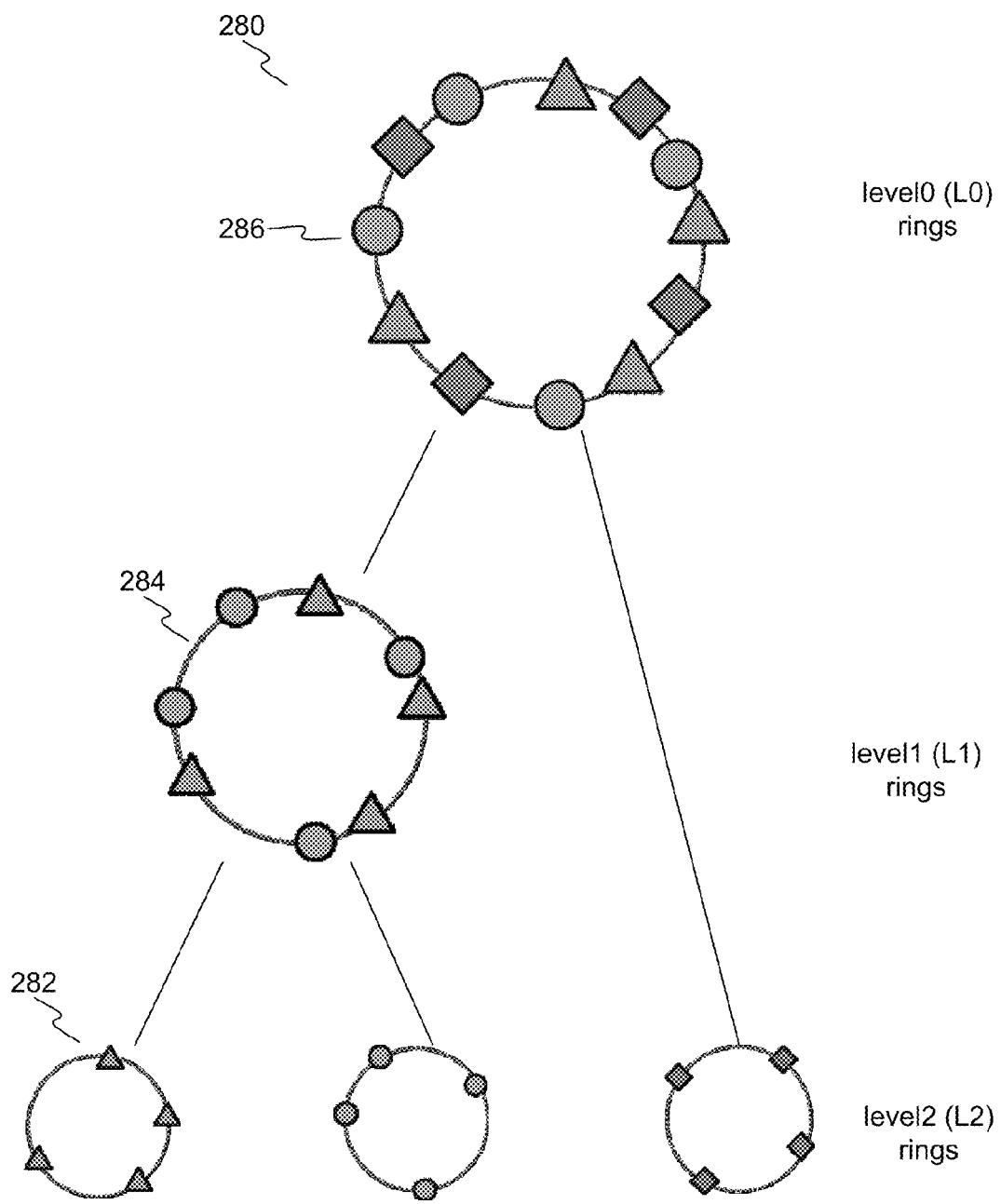
FIG. 6 shows a hierarchical representation where subnets are represented as first-order elements.

FIG. 6 shows a hierarchical representation 280 where subnets are represented as first-order elements. At the lowest level, subnets are organized in level2 rings. Each level2 ring is comprised of a group of sibling subnets, that is, subnets close to each other (in terms of latency or other measures of network distance) or subnets on a common network or branch office. For example, the ring 282 has four member subnets (triangles). Each level2 ring has its own identifier in the same identifier space as the other subnets. Each level1 ring 284 includes the subnets of all the subnets within it. In the example of FIG. 6. The level0 ring 286 contains all subnets. One way the DHT representation may be implemented will described next with reference to FIG. 7. The number of levels, distribution of subnets, and so forth, will depend on the particular network.

Figure 7:
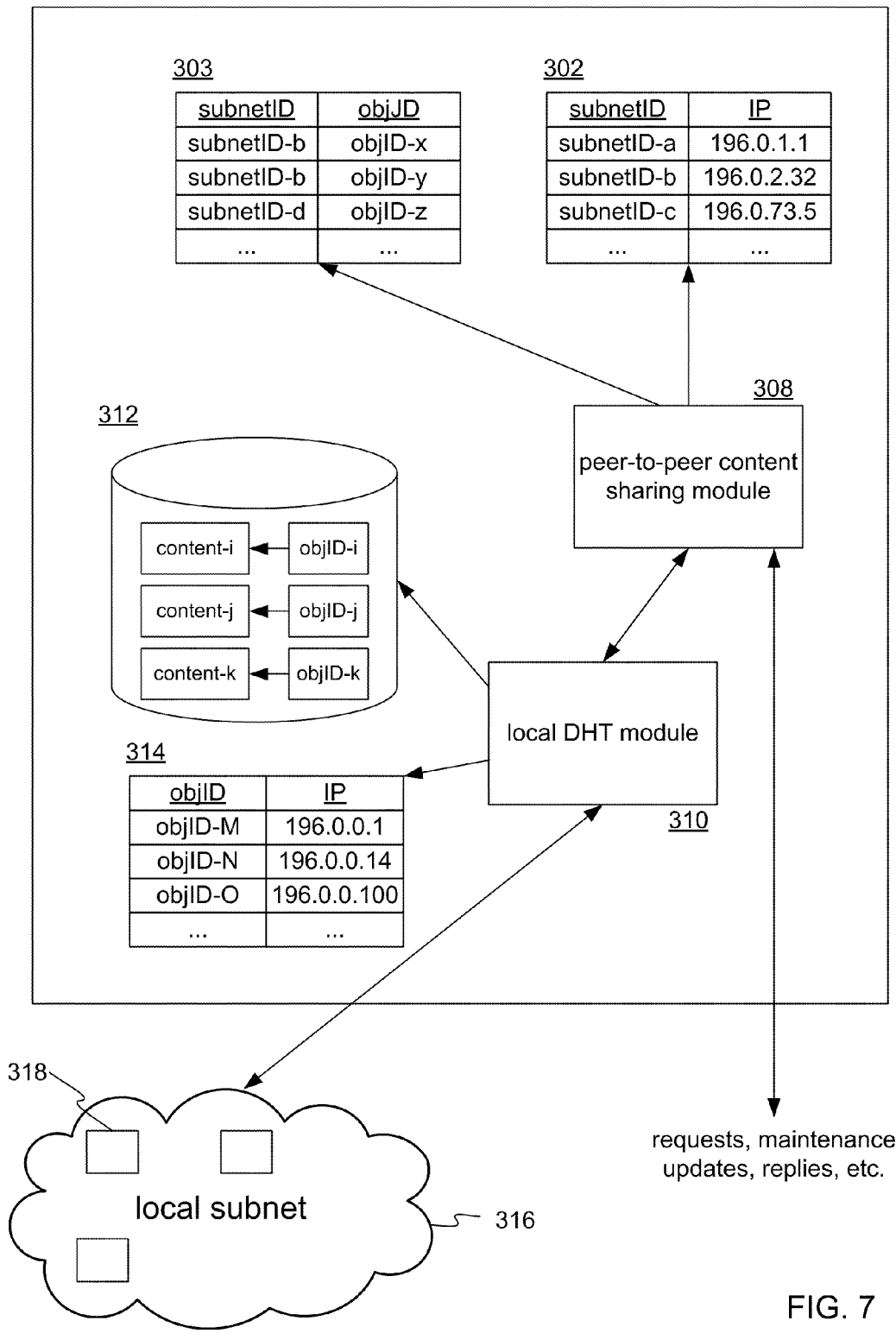
FIG. 7 shows a peer configured for proximity-guided resource discovery.

FIG. 7 shows a peer 202 configured for proximity-guided resource discovery. The peer 202 includes mapping information 302. The mapping information 302 is used primarily for maintaining contact points in the various subnets. For example, a search may be communicated to a subnet by transmitting the search to one of the peers in the subnet. Toward this end, the mapping information 302, whose content will differ from peer to peer, associates known subnets (by unique subnetID) with known addresses of peers therein. For example, IP address 196.0.0.1 is a peer in subnet having subnetID of "subnetID-a". When a peer joins, the mapping information 302 may be bootstrapped in a number of ways. Another peer in the subnet may supply a copy of its own mapping table. In another embodiment, a new peer may first discover the network's subnet structure and then transmit a broadcast to each discovered subnet to obtain one or more addresses of peers on a subnet. In yet another embodiment, the local DHT of each subnet may implement a maintenance protocol; when an incoming request is received from a remote new peer, a random sampling (for example) of addresses of local peers is returned to the remote new peer.

The mapping information 302 may be maintained in a number of ways. Subnet turnover ("churn") may be expected to be relatively infrequent. Rather than tracking which peers have which objects, peers keep an up-to-date set of peer IP addresses for a subnet. One technique is to use a simple caching technique where the IP addresses of a subnet are given a lifetime and are periodically refreshed if not used. When an address proves to be stale when a request is sent to it, the address is removed from the mapping information 302 and one or more new addresses are obtained, for example, from other peers in the new peer's subnet, or, from a neighboring subnet. Another technique is to randomly select one or more random addresses from a subnet.

In sum, the mapping information 302 stored collectively by the peers of a given subnet allows those peers to search for resources by transmitting requests in order from a most proximal subnet to, going up the global hierarchy (e.g., level1 rings, then level0 ring). A request is transmitted to a subnet by transmitting the request to a known address of a peer in the subnet (an address from mapping information 302), and the receiving peer's local DHT (or other form of local resource sharing) knows a subnet where the requested resource is available, the receiving peer's subnet/DHT returns the subnetID of any such subnets. It is not important which peers' network addresses of a given subnet are stored in the mapping information. The network addresses are simply communication points for communications directed to the corresponding subnet. If all of a peer's known network addresses for a subnet prove to be stale or unreachable, the peer may ask another peer, preferably on the local subnet, for new addresses of the subnet.

Peer 202 may also have a subnet-data mapping table 303 that maps subnets to objects. The mapping table 303 may be initialized by using a copy from another peer in the local subnet, or it may start in an empty state. The mapping table 303 may be maintained in various ways. As the peer 202 performs lookups and locates objects, or perhaps as it receives updates from other subnets (see, e.g., STAGE IVB in FIG. 8) it may store known subnet-object mappings in mapping table 303. Peer 202 may receive direct subnetID-objectID updates from local peers or from other subnets. Similarly, a peer may receive updates indicating that a subnet no longer has a given object, in which case any such entries would be deleted from mapping table 303.

The mapping table 303 and mapping information 302 are used by a peer-to-peer content sharing module 308. The peer-to-peer content sharing module uses the mapping table 303 and mapping information 302 to perform searches. The information is also maintained by the peer-to-peer content sharing module, which may receive and transmit maintenance updates to/from other peers. The module 308 also answers the searches of other peers. For example, a local or remote peer may request the location for objID-y. The module 308 would consult mapping table 303, determine that object-IDy is available at subnetID-b, and return the subnetID "subnetID-b" to the requesting peer. Note that the requesting peer may be another peer in the local subnet that is querying the local subnet in response to a request from a peer in another subnet, in which case the requesting peer would then forward the answer (e.g., "subnetID-b") to such peer. Note that in DHT terminology, objects and objectIDs are sometimes referred to as values and keys, respectively.

In one embodiment, the peers of a given subnet mutually implement their own peer-to-peer resource sharing mechanism, for example, a local DHT, a simple broadcast mechanism (similar to Vortex, available from Microsoft Corporation), etc. The maintenance of a local DHT is local; peers outside the local DHT may access the DHT but are not members. It is even possible that different subnets may use different types of DHTs or other resource-sharing schemes. Nonetheless, for search efficiency and other reasons, each local DHT (or other form of peer-to-peer sharing) uses keys and identifiers in a same global identifier space. Thus, peers in different subnets will still use the same subnetID for a given subnet and the same objectID for a given object, regardless of which subnet(s) are storing the object.

In one embodiment, the local resource sharing may be performed by a separate module, for example, a local DHT module 310. The local DHT module handles the functions involved with participating in the local DHT, and may use and maintain a cache of content 312 having objects (i.e., values) and corresponding identifiers (i.e., keys) as well as a list of local peers 314 (addresses) that have various objects. The local DHT module 310 may perform basic functions such as responding to object queries (queries for the location of an object), issuing such queries to the local DHT 316, sending and receiving maintenance updates, and so on. When the peer 202 is to search for an object, peer-to-peer content sharing module may first use the local DHT module 310 to determine if a requested object is available locally at a peer 318 in the peer 202's local DHT. Also, after receiving a location of a requested objectID and downloading the object, peer-to-peer content sharing module 308 may inform the local DHT module 310 of the newly obtained content, in response to which the local DHT module 310 will update its local cache of content 312.

Figure 8:
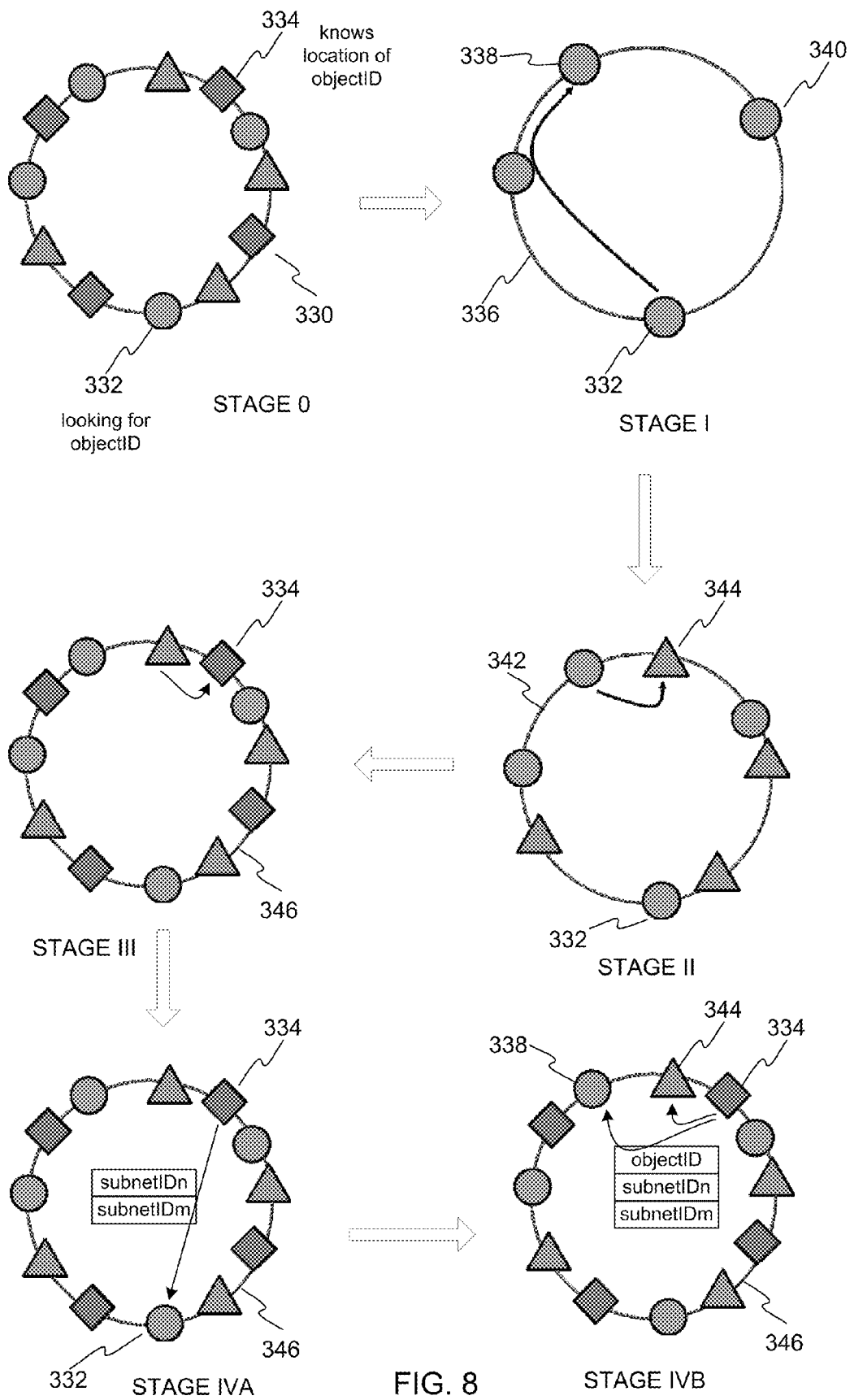
FIG. 8 shows an example of a proximity-guided search of a hierarchy of subnets.

FIG. 8 shows an example of a proximity-guided search of a hierarchy of subnets 330. The hierarchy of subnets 330 is similar to the example hierarchical representation 280 in FIG. 6. Initially, at STAGE 0, a peer at subnet 332 is searching for an objectID, and a remote subnet 334 knows a location of the objectID. At STAGE I, assuming that the requesting peer was unable to find the objectID on itself or its local subnet (e.g., on local DHT), the requesting peer searches other subnets based on proximity (e.g., subnets less than 5 ms distance). In other words, the requesting peer on subnet 332 will search other subnets on its level2 ring 336, preferably in order of increasing subnetID. As the subnetIDs and objectIDs are in the same key/ID space, the search of a given level need only proceed until a subnetID is reached that is greater than the sought objectID, at which time it is known that the object is not available on the current ring level. In the example of FIG. 8, the requesting peer contacts two other subnets, neither of which responds with a location of the target objectID. If subnet 338 is queried without success, and the next subnet 340 has a subnetID greater than the requested objectID, then the requesting peer on subnet 332 will start to search less proximate subnets, i.e., subnets higher up the hierarchy.

At stage II, the requesting peer begins searching the next most proximate subnets—the level1 ring 342 (e.g., subnets less than 30 ms distant). This part of the search may start with the subnet whose subnetID is next in sequence after the last searched subnet 338—subnet 344. The level1 subnets whose subnetID is less than the sought objectID do not have a location of the object, and the search proceeds up another level to the level0 ring 336. The next subnet at level0 whose subnetID is closest to the last searched subnet (subnet 344) is subnet 334, and the requesting peer queries subnet 334. One or more peers on subnet 334 have in their mapping table information 303 the sought objectID and corresponding subnetIDs subnetIDm and subnetIDn. AT STAGE IVA, SubnetIDm and subnetIDn are returned to the requesting peer on subnet 346, which may then use the subnetIDs to request a peer address from which to obtain the object. At an optional STAGE IVB, the responding subnet 334 may correctly conclude that no subnets with subnetID of subnet 332 up to and including the subnetID of subnet 344 know the location of the sought objectID (otherwise, the search would not have proceed to the level0 ring). Therefore, the responding subnet 334 may also transmit the objectID and corresponding known subnetIDs to one or more such subnets. In one embodiment, only one subnet at each intervening level receives the update; the subnet whose subnetID is closest (at its level) to the objectID.

When a requesting peer has obtained a subnetID of a subnet (e.g., subnetIDm) that is storing the sought object, the requesting peer then looks in its mapping information 302 to find an address of subnetIDm and sends a request to the local DHT of that subnet. The peer may use the found address as a point for communicating with the target subnet (subnetIDm), receiving from the address the address of a peer (on subnetIDm) having the object. The requesting peer then uses the obtained address to transfer the object from the corresponding remote peer.

Figure 9:
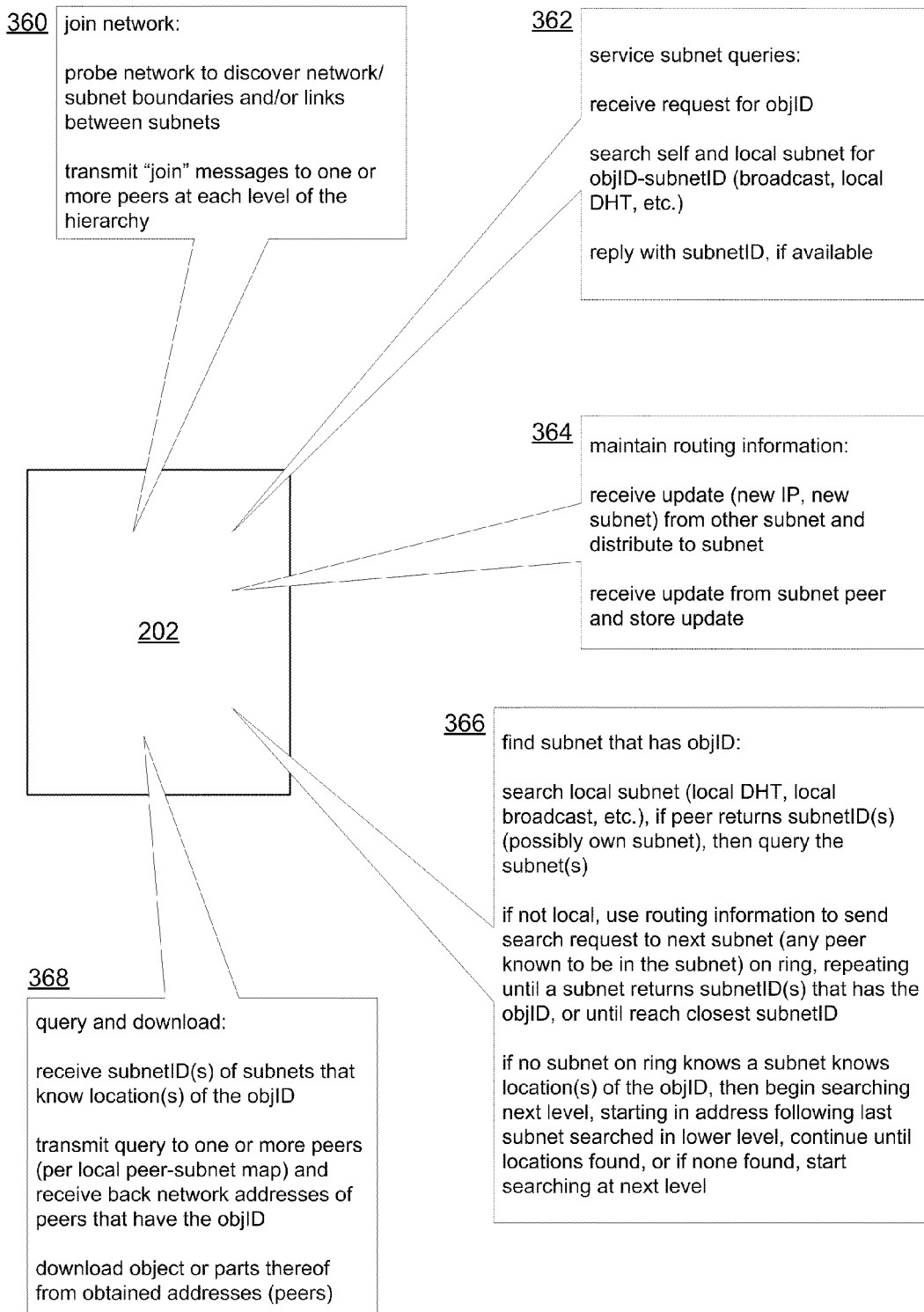
FIG. 9 shows various processes that may be performed by a peer.

FIG. 9 shows various processes that may be performed by a peer 202. A peer 202 may join 360 by probing the network to discover subnet boundaries (jumps in latency, hop-count thresholds, etc.) or other information that indicate proximity, and then may transmit "join" messages to local peers and optionally other subnets. A peer 202 may service 362 subnet queries. When a requested objectID directed to the peer's subnet is received, the peer may search itself and/or its local subnet for a subnetID that has the objectID, and return same if found. The peer 202 may also maintain 364 routing information, which may entail receiving updates from other subnets and distributing them to other local peers, and conversely, storing such updates from other local peers. Peer 202 may also have a search process to find 366 a subnet that has a needed objectID. This may involve searching the local subnet, then searching subnets in order of proximity and subnetID until a subnet returns a subnetID of a subnet that has the needed object. The peer 202 may also have a process to query and download. Namely, after receiving the subnetID of a subnet that has a needed object, the peer may query the subnet and receive the address of a peer (on that subnet) that has the object. The object (and/or parts thereof) is then downloaded from that peer. The preceding processes may be implemented using the peer configuration shown in FIG. 7, or using any other arbitrary peer design.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

Figure 10:
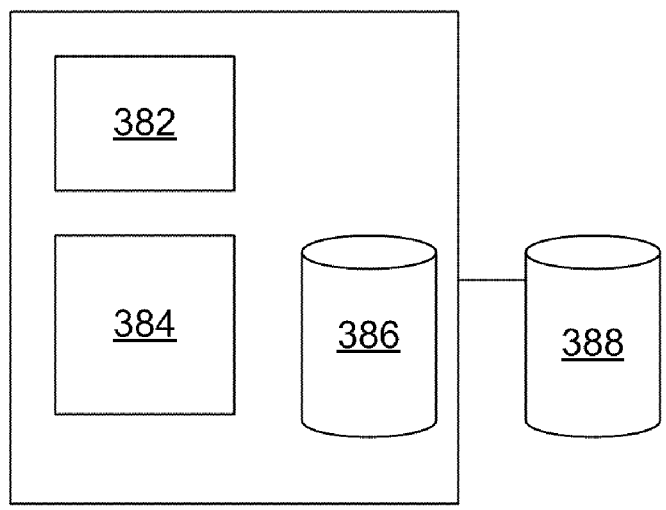
FIG. 10 shows an example computing device.

FIG. 10 shows an example computing device 380 which may run software implementing any of the techniques or features described herein. The computing device may have known elements such as a processor 382 cooperating with memory 384 and possibly local storage 386 and/or peripheral storage 388, which may serve as the aforementioned device readable media.

The invention claimed is:

1. A method performed by a computing device comprising a peer to search for other peers comprising computing devices on a network that have data or provide resources, comprised of a hierarchy of locality domains through which the peers connect to the network, each locality domain, peer, and data/ resource having a respective unique identifier, and the peers cooperatively storing data or providing resources such that the organization of the peer structure is at the level of locality domains and which form a hierarchy based on network proximity, wherein the search for data and resources happens at the level of locality domains according to the method, which comprises:

searching the peer's local locality domain for a data or resource based on the data or resource's identifier, wherein the data or resource is not found in the local locality domain, and in response to the searching, receiving from other peers in the locality domain a plurality of target locality domain identifiers of respective different target locality domains in a lowest cluster in which the peer's locality domain is a member, wherein the peers of a locality domain perform maintenance functions to enable the locality domain to participate in the hierarchy of clusters and the peers of the locality domain cooperate to implement a distributed hash table (DHT) on the locality domain, wherein each locality domain implements its own DHT that is separate from the DHTs of the other locality domains;

searching the target locality domains by using the target locality domain identifiers in a lowest ring to identify respective target peer devices and sending search requests comprising the identifier of the data or resource to the identified peer devices to the identified target peer devices, wherein the requests are sent sequentially in an order according to network proximity to the peer such that the target locality domains are searched in order of decreasing network proximity to the peer;

when one of the target locality domains in the lowest cluster has a peer with indicia of a target locality domain where the data or resource is available, receiving an identifier of the target locality domain from one of the peers of such locality domain; and transmitting a request to a peer on the target locality domain of the received locality domain identifier, the request comprising the identifier of the data or resource and retrieving the data or resource from the peer device corresponding to the received identifier.

2. A method according to claim 1, wherein the locality domains are searched in an order based on their identifiers.

3. A method according to claim 1, wherein locality domains are placed in clusters according to network proximity to the peer such that the peer searches locality domains in order of decreasing network proximity to the peer.

4. A method according to claim 1, wherein the network comprises an enterprise network spanning a plurality of different geographic sites.

5. A method according to claim 1, wherein the resource is retrieved from a peer identified by an identifier received in response to the request sent to the peer on the target locality domain.

6. A method according to claim 5, wherein the identifier of the peer having the resource is obtained based on the transmitted locality domain identifier.

7. A computing device comprising:

a peer participating in a peer-to-peer resource sharing network where peers store key-value pairs, the peers communicating via a network comprised of a hierarchy of locality domains to which the peers belong, each locality domain comprising an organizational unit of peers, wherein the peers of a locality domain perform maintenance functions to enable the locality domain to participate in the hierarchy and the peers of the locality domain cooperate to implement a distributed hash table (DHT) on the locality domain, wherein each locality domain implements its own DHT that is separate and autonomous with respect to the DHTs of the other locality domains;

the peer including a first storage unit storing associations between keys and identifiers of locality domains on which identifiers of peers storing the corresponding keys can be found; and the peer including a search-reply module that: receives a query from another peer in the peer-to-peer network, where the query comprises a key of a resource sought by the other peer, searches the storage unit for the key, and if the key is found transmits over the network an identifier of the locality domain associated with the key in the first storage unit, the other peer using the identifier of the locality domain to obtain a network address of a peer in the locality domain and then transmitting the key to the peer in the locality domain which in turn initiates a search for the key by the peers in the locality domain.

8. A computing device according to claim 7, wherein the network comprises an enterprise network spanning geographically dispersed locations and the locality domain comprises subnets.

9. A computing device according to claim 8 wherein the peer further comprises:

a second storage unit storing keys and associated values comprising resources; and a resource-reply module that receives a key from another peer, searches the second storage unit for the key, and returns to the other peer the resource associated with the key.

10. A computing device according to claim 7, wherein operations performed to cause a locality domain to participate in the hierarchy are balanced across the peers in the locality domain.

11. A computing device according to claim 10, wherein the peer stores information indicating structure of the hierarchy by storing identifiers of peers that are in locality domains at each level of the hierarchy.

12. A method performed by a computing device operating as a requestor peer in a peer-to-peer network, the requestor peer participating in a network of other peers with interconnectivity over a network comprised of locality domains to which the peers belong, the method comprising:

maintaining one or more identifiers of one or more respective locality domains at each level of a hierarchy of the locality domains, the hierarchy comprising lowest level groups comprised of locality domains, mid-level groups, where a mid-level group is comprised of the locality domains in the corresponding lowest level groups below the mid-level group, and a top-level group comprised of all of the locality domains in the hierarchy, the peers storing values and corresponding keys in a key space, wherein peers in the peer-to-peer network maintain respective mappings between subnet identifiers and resource identifiers and mappings between subnet identifiers and network addresses of peers on the corresponding locality domains, wherein the peers of a lowest level group perform maintenance functions to enable the locality domain to participate in the hierarchy and the peers of the locality domain cooperate to implement a distributed hash table (DHT) on the locality domain, wherein each locality domain implements its own DHT that is separate from the DHTs of the other locality domains;

in response to an application on the requestor peer requesting a resource, searching via the network for a subnet identifier of a target subnet where there is stored an identifier of a peer that is storing the resource, the resource having a corresponding target key in the key space; and using the subnet identifier of the target subnet to obtain from the mappings a network address of a first peer in the target subnet, and then sending a request for the target key via the network to the network address of the first peer, wherein the first peer responds by initiating a search for the target key among the peers in the target subnet resulting in finding an identifier of a second peer in the target subnet that is storing the resource, and when the identifier of the second peer is obtained, obtaining the resource from the second peer.

13. A method according to claim 12, wherein the hierarchy is structured based on network proximity of locality domains to peers such that the requestor peer, when searching for the identifier of the target locality domain, will search locality domains that are more proximate to the requestor peer than other locality domains before searching the other subnets.

14. A method according to claim 12, wherein the groups comprise rings, and the locality domains in a ring are ordered along such ring according to increasing value of the identifiers of the locality domains.

15. A method according to claim 12, for sharing or load-balancing the functionality of a locality domain (corresponding to a logical unit in the peer organization structure) among individual peers belonging to that locality domain so that resilience is provided against peer departures from the locality domain and against overloading any single peer in the domain in terms of processing required for organization structure maintenance and search functionality.

16. A method according to claim 12, wherein the searching for the identifier of the target subnet comprises searching subnets in an order according to the hierarchy such that locality domains in lower levels of the hierarchy are searched before locality domains in upper levels of the hierarchy.

17. A method according to claim 16, wherein the hierarchy is structured according to network latencies such that, relative to any given peer, a given group of the hierarchy contains groups of locality domains below the given group to which the given peer belongs and groups of subnets below the given group to which the given peer does not belong, where the groups of locality domains to which the given peer does not belong have greater latency to the given peer than the groups of locality domains to which the given peer does belong.

18. A method according to claim 12, wherein the network comprised of locality domains comprises an enterprise network and the locality domains thereof are at different geographically disperse sites.

19. A method according to claim 18, wherein the searching further comprises stopping searching of the locality domains of the given ring when none of the locality domains in the given ring whose identifier value is below the value of the key of the key being searched have a location of the resource.

* * * * *